United States Patent Office 3,236,626
Patented Feb. 22, 1966

3,236,626
DISPERSANT COMPOSITIONS AND TOXICANT
CONCENTRATES CONTAINING THE SAME
Paul L. Lindner, Evanston, Ill., assignor to Witco Chemical Company, Inc., New York, N.Y., a corporation of Delaware
No Drawing. Filed Mar. 20, 1961, Ser. No. 96,660
11 Claims. (Cl. 71—3)

My invention relates to the production of new and useful dispersant compositions and to liquid biocidal toxicant compositions, particularly in the form of toxicant concentrates, containing said dispersants.

It has been found to be highly desirable, in certain situations, to be able to apply to an earth soil, in which plant or vegetable life is grown or contemplated to be grown, both water-soluble fertilizer material and also a desired pesticide, to wit, water-insoluble organic solvent-soluble insecticide, weed killer, or soil fumigant, hereafter generically called biocidal toxicant, in the form of a single composition. Efforts to provide such a composition, for instance, in the form of a stable, mobile, pourable or pumpable liquid emulsion, by simple mixing, present certain serious problems. The water-soluble fertilizer materials comprise water-soluble compounds, typical examples of which are potassium chloride, potassium nitrate, ammonium nitrate, ammonium sulphate, potassium sulphate, ammonium phosphate, and urea, with or without supplemental materials.

When dissolved in water to form strong solutions, particularly solutions approximating concentrated solutions, constituting the aqueous phase, and admixed with biocidal toxicant concentrates containing biocidal toxicants dissolved in organic solvents and insoluble in said aqueous phase, or solutions of such biocidal toxicants in organic solvents wherein said latter solutions, constituting the oleaginous phase, are insoluble in said aqueous phase, unstable dispersions form which readily and promptly separate out in the form of layers. Efforts to emulsify such aqueous phases and such oleaginous phases by means of usual types of emulsifying agents used in the toxicant emulsion field have proved entirely unsatisfactory. Nonionic emulsifiers of the type of the polyoxyethylene derivatives of lipophillic materials, for instance, polyethylene glycol ethers of sorbitan monostearate, polyethylene glycol ethers of sorbitan monooleate, alkyl phenoxy polyoxyethanols, iso-octyl phenol polyoxyethylene ethers, and the like, have been found to be ineffective since they are salted out by the strong electrolytes in the high concentrations used in liquid fertilizer solutions. Similarly, higher alkyl aryl sulfonates, such as alkali metal, ammonium, magnesium or calcium salts of dodecyl benzene sulfonate, and the like, have likewise been found to be entirely unsatisfactory, whether used in conjunction with the non-ionic emulsifiers of the type mentioned above or by themselves.

The problem of providing satisfactory emulsions of aqueous liquid fertilizer solutions, particularly strong solutions, containing upwards of 20% of water-soluble fertilizer ingredients such as the monovalent and polyvalent ionic compounds described above and up to saturated aqueous solutions of said fertilizer solutions, with water-insoluble organic solvent-soluble biocidal toxicants has, so far as I am aware, not remotely been solved by others despite intensive efforts to do so. In certain instances, by means of special combinations of ingredients, it has been possible to prepare liquid fertilizer-biocidal toxicant compositions, but these must be prepared immediately prior to being used and must be used promptly since, among other things, their stability is of extremely short duration. Other special combinations of ingredients have been suggested, for instance, which are of use in liquid fertilizer-biocidal toxicant compositions but only if the liquid fertilizer contains trivalent phosphate ions and urea. In the presence of monovalent ions such as chlorides or nitrates, such latter compositions are of no commercial value because the emulsifying action of the combination of ingredients is destroyed.

It is important from the standpoint of fully satisfactory commercial practice that the dispersant compositions be soluble and form clear or essentially clear solutions in the biocidal toxicant concentrates, which latter comprise organic solvent solutions of water-insoluble biocidal toxicants, and that said concentrates containing the dispersant compositions dissolved therein form good emulsions when mixed with strong aqueous fertilizer solutions. The compositions of the present invention satisfy these rigid requirements.

I have discovered new and useful biocidal toxicant concentrates (and dispersant compositions for use therein) which, when admixed, by simple mixing, with liquid fertilizer compositions in the form of strong aqueous solutions, say in excess of 20% concentration up to saturation, produce homogeneous emulsions or dispersions which remain usable for periods of the order of at least several hours. My invention makes it unnecessary to premix the biocidal toxicant concentrate with water just prior to admixing it with the liquid fertilizer solution, as is required with certain heretofore known biocidal toxicant concentrates. All that is necessary, in the case of biocidal toxicant concentrates made in accordance with my invention, is simple mixing or agitation with the liquid fertilizer solution. Moreover, my novel biocidal toxicant concentrates can effectively be used with liquid fertilizer compositions irrespective of whether the latter contain monovalent or polyvalent ions, and they are also usable with more dilute solutions of liquid fertilizers as, for instance, those containing of the order of 10 to 15% of solids. Thus, they have a universality of utility which is a most important practical consideration.

I have discovered that if there are utilized, in admixture, certain materials falling into two separate classes, and which are employed in certain ratios with respect to each other, all as is hereafter described in detail, a synergistic effect is obtained which brings about the entirely unpredictable and unexpected results which are achieved by my present invention.

The first of these ingredients, which, for convenience, may be called the (a) ingredient, comprises certain alcoholic compounds.

One of these groups of alcoholic compounds comprises straight chain or branched chain aliphatic monohydric alcohols containing from 6 to 12 carbon atoms and exemplified by n-hexyl alcohol, n-octyl alcohol, iso-octyl alcohol, 2-ethyl hexyl alcohol, n-decyl alcohol, iso-decyl alcohol, and dodecyl alcohol.

Another of these groups of alcoholic compounds constituting the (a) ingredient comprise non-ionic oil-soluble or organic solvent-soluble surface-active addition products of ethylene oxide and/or propylene oxide. By organic solvent-soluble, it is contemplated that said (a) ingredient is soluble in the particular organic solvents or solvent mixtures conventionally used in toxicant concentrate compositions or employed in any given toxicant concentrate composition in which the dispersant compositions of the present invention are utilized, or, more particularly, in the organic solvent solutions of the biocidal toxicants into which solutions said (a) ingredient is intended to be incorporated.

The aforesaid non-ionic oil-soluble or organic solvent-soluble surface active addition products are condensation products or adducts of an alkylene oxide selected from the group consisting of ethylene oxide and propylene oxide or mixtures of said oxides with compounds containing a long chain aliphatic hydrocarbon radical, that is, one containing at least 8 and usually up to about 26 carbon atoms. Said latter compounds include fatty acids, fatty alcohols, and fatty mercaptans containing at least 8 and usually from 12 to 18 or 24 carbon atoms; rosin acids; higher monocarboxylic, usually 12 to 18 carbon atom fatty, acid partial esters of water-soluble aliphatic polyhydric alcohols in which the said polyhydric alcohols generally contain from 2 to 6 carbon atoms and from 2 to 6 free hydroxyl groups; partial esters of hexitol anhydrides with higher molecular weight monocarboxylic acids, usually 12 to 18 carbon atom fatty acids, or with rosin acids; alkyl phenols and bisphenols in which the alkyl radical usually contains from 5 to 18 carbon atoms; aliphatic and fatty amines containing at least 8 and generally from 12 to 18 or up to 26 carbon atoms; aliphatic and fatty acid amides and alkylolamides in which the aliphatic and fatty acid radicals generally contain at least 8 and more usually from 12 to 18 carbon atoms; and propylene oxide-ethylene oxide condensation products or adducts such as the products sold under the trademark "Tergitol XC" which is an adduct of butyl alcohol, propylene oxide and ethylene oxide. In general, the number of ethylene oxide groups in the molecule of the condensation products or adducts with the compounds containing the long chain aliphatic hydrocarbon radical will range up to about 60 with a particularly preferred range normally being from about 5 or 8 to about 20; where propylene oxide is the alkylene oxide used, the number of propylene oxide groups in the said condensation products or adducts with the compounds containing the long chain aliphatic hydrocarbon radical should, for best results, ordinarily not exceed about 10 and more advantageously should lie within the range of 1 to 5; and where the compounds containing the long chain aliphatic hydrocarbon radical are condensed or adducted with both ethylene oxide and propylene oxide, the molecule of the adduct will advantageously contain from 8 to 20 ethylene oxide groups and from 1 to 5 propylene oxide groups.

In the molecules of most of the (a) group of compounds, there will be present a higher molecular weight radical containing from 8 to 26 carbon atoms linked, directly or through other groupings, to a polyoxyethylene radical containing up to 60 oxyethylene groups and preferably from 5 or 8 to about 20 or a polyoxypropylene radical containing up to 10 oxypropylene groups, or both oxyethylene and oxypropylene groups as pointed out above.

At least many of the (a) group of compounds utilized in accordance with the present invention may be characterized as being higher molecular weight ethers and thioethers of polyoxyalkylene glycols, and higher molecular weight carboxylic acid, preferably fatty acid, esters of polyoxyalkylene glycols, the higher molecular weight radicals containing from 8 to 26, preferably 8 to 18, carbon atoms, the polyoxyalkylene glycol being a polyoxyethylene glycol or a polyoxypropylene glycol or a polyglycol containing both oxyethylene and oxypropylene radicals, the number of oxyethylene and/or oxypropylene groups in the molecule being in the range of values stated above.

Again, at least most of said (a) compounds may be characterized as non-ionic surface active agents which are polyoxyalkylene oxide adducts of organic compounds having a terminal group containing a reactive hydrogen atom and selected from the class consisting of alkyl monohydric and aliphatic polyhydric alcohols, polypropylene oxides, mono-ethers of polypropylene glycol and polybutylene glycol with hydroxy-alkyl, hydroxy-aryl and hydroxy-alkyl-aryl compounds, fatty acids, fatty acid amides, alkyl mercaptans, partial fatty acid esters of aliphatic polyhydric alcohols, alkylated phenols and hydroxy-alkyl-aryl compounds, the aforesaid organic compounds having at least one lipophillic group containing at least 6 carbon atoms and having not more than 2 aromatic rings and the polyoxyalkylene portion of said non-ionic surface active agent containing from 4 to 60 ethylene oxide groups or up to 10 propylene oxide groups, or both ethylene oxide and propylene oxide groups.

The aforesaid (a) ingredients are, per se, well known in the art and have long been known and used as emulsifying agents in a variety of environments. They are disclosed in numerous publications and patents, typical of the latter being U.S. Reissue Patent No. 24,184; and U.S. Patents Nos. 2,447,475; 2,509,233; 2,552,187; 2,588,318; 2,805,992; 2,809,122; 2,829,035 and 2,898,267.

Illustrative examples of particularly preferred embodiments of the aforesaid (a) ingredient are 2-ethyl-hexanol; adducts of nonyl phenol with 8 to 15 mols of ethylene oxide; adducts of tall oil fatty acids with 5 to 10 mols of ethylene oxide; adducts of dodecyl alcohol with 5 to 7 mols of ethylene oxide; adducts of butyl alcohol-propylene oxide-ethylene oxide such as "Tergitol XC"; and adducts of iso-octyl phenol with 10 to 11 mols of ethylene oxide.

The second of said ingredients, which may, for convenience, be called the (b) ingredient, comprises certain salts of sulfopolycarboxylic acid esters or amides of lipophillic compounds which contain in their molecule an aliphatic hydrocarbon radical having at least 8 and usually from 8 to 18 carbon atoms, but as high as 26 carbon atoms. Where, however, the aliphatic hydrocarbon radical is a substituent in an aromatic ring compound, as in alkyl phenols, the said aliphatic hydrocarbon radical may contain a chain of as low as 5 carbon atoms. The (b) ingredient is advantageously water-soluble or readily water-dispersible, although in its broader aspects it may be soluble in the organic solvents utilized in the production of the toxicant compositions contemplated by my present invention. Generally speaking, the (b) ingredient is a sulfopolycarboxylic acid ester of a compound containing in its molecule at least one esterifiable hydroxyl group and at least one aliphatic hydrocarbon radical, usually an alkyl or acyl radical, containing at least 8 and better still at least 12 and usually from 12 to 18 carbon atoms; or the (b) ingredient is a sulfopolycarboxylic acid amide of a compound containing in its molecule at least one imino or amino group and at least one aliphatic hydrocarbon radical as in the sulfopolycarboxylic acid esters.

The polycarboxylic acids, the sulfo-derivatives of which are employed in the preparation of the (b) ingredient, can be chosen from a large group, typical or illustrative examples of which are maleic acid, fumaric acid, tartaric acid, glutaconic acid, itaconic acid, adipic acid, phthalic acid, sebacic acid, tricarballylic acid, and glutaric acid. Of particular utility are the aliphatic sulfopolycarboxylic acids, especially the water-soluble sulfodicarboxylic acids containing from 4 to 8 carbon atoms. The sulfosuccinic acid derivatives are especially satisfactory.

The (b) ingredients are utilized, pursuant to my invention, in the form of certain classes of salts, all as is more particularly pointed out hereafter.

The sulfopolycarboxylic acid derivatives are utilized, in the compositions of my invention, in the form of their organic substituted ammonium di-salts, or in the form of mixed alkali metal and organic substituted ammonium salts. Thus, for instance, in the case of the sulfodicarboxylic and sulfotricarboxylic acid derivatives, which may be represented by the formula

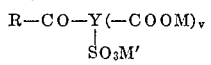

where R is the radical of the compound which contains at least one free or esterifiable hydroxyl group or an imino or amino group and an aliphatic hydrocarbon chain of at least 8 carbon atoms, Y is the completely decarboxylated residue of a polycarboxylic acid, M is a member selected from the group consisting of an alkali metal and an organic substituted ammonium radical, M' is an organic substituted ammonium radical, and $v$ is 1 or 2, the said salt may be the organic substituted ammonium di-salt, that is, where both M and M' are organic substituted ammonium radicals, which may be the same or different organic substituted ammonium radicals; or the said salt may be a half alkali metal and half organic substituted ammonium salt which is the case where M is an alkali metal and M' is an organic substituted ammonium radical. Of particular utility, as the (b) ingredient, are the organic substituted ammonium di-salts and the half ammonium half organic substituted ammonium salts of the sulfosuccinic acid esters and of the sulfosuccinic acid amides of compounds containing a long chain hydrocarbon radical such as 2-ethyl hexanol; 1 to 3 mol or 10 to 11 mol ethylene oxide adducts of nonyl phenol; 8 to 20 mol ethylene oxide adducts of sorbitan mono-oleate; and 5 to 7 mol ethylene oxide adducts of soya amines, tallow amines and propyl amine-soya amines; and oleic acid amides of monoethanolamine and monoisopropanolamine, wherein the organic substituted ammonium radical is derived from an alkyl amine containing from 1 to 6 carbon atoms, especially isopropylamine. In the case of the sulfotricarboxylic acid derivatives, the said salt may be the organic substituted ammonium tri-salt, that is, where both M and M' are organic substituted ammonium radicals, which may be the same or different organic substituted ammonium radicals; or the said salt may be a one-third alkali metal and two-thirds organic substituted ammonium salt, in which case M is an organic substituted ammonium radical and M' is an alkali metal; or vice versa, that is, said salt may be a two-thirds alkali metal and one-third organic substituted ammonium salt, in which case M is an alkali metal and M' is an organic substituted ammonium radical.

Various of the sulfopolycarboxylic acid derivatives utilized as the (b) ingredient of the compositions of my invention are shown in my copending applications Serial No. 606,182, filed August 27, 1956, which has issued into Patent No. 2,976,209; Serial No. 716,567, filed February 21, 1958, which has issued into Patent No. 2,976,211; and Serial No. 6,349, filed February 3, 1960, which has issued into Patent No. 2,976,208; my copending applications Serial No. 96,661 and Serial No. 96,662, now U.S. Patent No. 3,080,280, filed of even date herewith; and such U.S. patents as Nos. 2,028,091, 2,236,528, 2,236,529, 2,239,720, 2,251,940, and 2,315,375.

The salt-forming radicals represented by M or M' comprise, in the case of M, alkali metals (which term is here used to mean sodium, potassium, lithium and ammonium); and, in the case of M and M', organic substituted ammonium radicals. The latter, which most advantageously are water-soluble lower molecular weight amines, may be selected from a wide group, typical examples of which are dimethylamine; diethylamine; triethylamine; propylamine; monoisopropylamine, diisopropylamine, triisopropylamine, and commercial mixtures of said isopropylamines; butyl amine; amyl amine; mono-isopropanolamine, diisopropanolamine, triisopropanolamine and commercial mixtures of said isopropanolamines; ethanolamines such as monoethanolamine, diethanolamine, triethanolamine, and commercial mixtures thereof; polyamines such as aminoethyl ethanolamine, ethylenediamine, diethylenetriamine, hydroxyethyl ethylenediamine, and hexamethylenediamine; hexylamine; cyclohexylamine; dimethylbenzylamine, benzylamine; morpholine; methylcyclohexylamine; alkyl alkanolamines such as ethyl diethanolamine and diethyl ethanolamine; furfurylamine; piperidine; 2-amino-2-methyl-1-propanol; 2-amino-1-butanol; methyl piperidine, and the like; as well as long chain amines such as octyl amine, dodecyl amine, hexadecyl amine, octadecyl amine, soya amines, soyapropyl amines, and the like; and compatible mixtures of any two or more thereof.

Illustrative examples of said (b) ingredient are the following (which include, also, the isomers thereof):

(1) 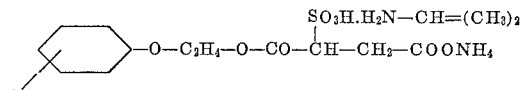

Half ammonium half isopropylamine salt of nonyl phenol mono-ethenoxy sulfosuccinate (2) 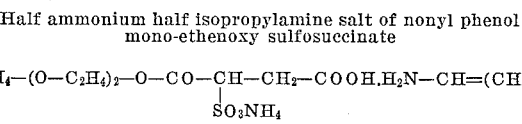

Half ammonium half isopropylamine salt of nonyl phenol tri-ethenoxy sulfosuccinate (3) 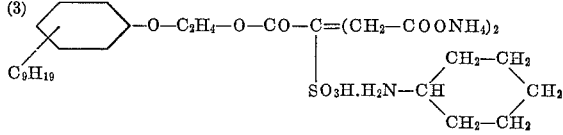

Two-thirds ammonium one-third cyclohexylamine salt of nonyl phenol mono-ethenoxy sulfotricarballylate (4) 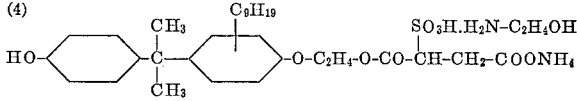

Half ammonium half monoethanolamine salt of nonyl bisphenol mono-ethenoxy sulfosuccinate (5) 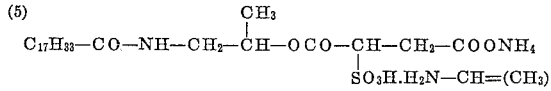

Half ammonium half isopropylamine salt of the sulfosuccinic acid ester of the oleic acid amide of monoisopropanolamine (6) 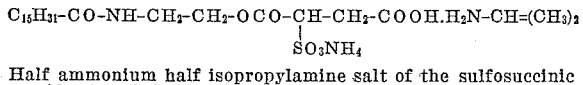

Half ammonium half isopropylamine salt of the sulfosuccinic acid ester of the palmitic acid amide of monoethanolamine (7) 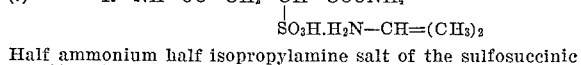

Half ammonium half isopropylamine salt of the sulfosuccinic acid amide of soya amines (R—NH— being the soya fatty amine radical)

(8) 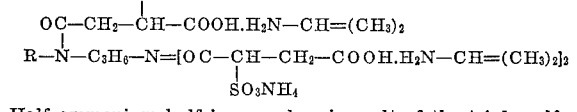

Half ammonium half isopropyl amine salt of the triple sulfosuccinic acid amide of soya aminepropyl amines (R—N— being the soya fatty amine radical)

(9) 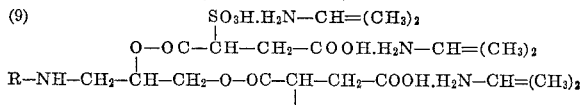

(Where R is the alkyl group of a soya amine radical)
Isopropyl amine salt of soya amine propylene glycol disulfosuccinate It will be understood, of course, that mixtures of any two or more of the (a) and any two or more of the (b) ingredients can be employed in the practice of my present invention; and, also, that said (a) and (b) ingredients can be utilized in the form of impure reaction products containing high percentages of the active constituents thereof.

The biocidal toxicants which are used in accordance with my present invention and which, as stated above, comprise insecticides and soil fumigants, may be selected from a wide group typical examples of which are "Aldrin" (1,2,3,4,10,10 - hexachloro - 1,4,4a,5,8,8a, - hexahydro- 1,4,5,8-dimethanonaphthalene); "Dieldrin" (1,2,3,4,10,10-hexachloro-6,7-epoxy, 1,4,4a,5,6,7,8,8a-octahydroxy-1,4-endo-oxo-5,8-dimethanonaphthalene); "Lindane" (gamma isomer of benzene hexachloride); "Heptachlor" (1,4, 5,6,7,8,8-heptachloro - 3a,4,7,7a - tetrahydro - 4,7 - endo-methanoindene); "Nemagon" (1,2-dibromo-3-chloropropane); ethylene dibromide; DDT; organic thiocyanates such as B-butoxy, B'-thiocyanodiethyl ether; bornyl thiocyanoacetate; trichlorobenzene; propyl, butyl, and amyl ethers of pentachlorophenol, and the like, and compatible mixtures of any two or more thereof. Of especial importance are "Aldrin," "Dieldrin," "Lindane," "Heptochlor," and "Nemagon."

The organic solvent which is utilized in the preparation of the biocidal toxicant concentrates of my present invention, and in which the biocidal toxicant is soluble, may be selected from a known group of such organic solvents. Such organic solvents are of the type which are insoluble in the aqueous phase and, at least in most cases, will be per se insoluble in water. For convenience, said organic solvents are referred to herein as being "water-insoluble," and the same is true of the biocidal toxicants, although the criterion is essential insolubility in the aqueous phase of the emulsion. These include, for instance, aromatic hydrocarbon solvents, or blends thereof with paraffinic or naphthenic solvents. Examples of such solvents are kerosene; light refined mineral oil; methylnaphthalenes such as monomethyl naphthalene, dimethyl naphthalene and trimethyl naphthalene; ethyl naphthalene; 2-methylpentanediol-1,2; dipropylene glycol methyl ethers; benzene, toluene, aromatic naphthas, xylene, tetrahydronaphthalene, cyclohexane, and the like. These and various other organic solvents are frequently sold under trade names, such as "Cyclosol 53," which is an aromatic petroleum fraction comprising methylated naphthalenes; and "Sovacide 544C" which is an aromatic petroleum oil containing methylated naphthalenes.

The (a) and (b) ingredients are incorporated into solutions of the biocidal toxicants in the selected organic solvent or mixtures of organic solvents to produce biocidal toxicant concentrates. Typical of such biocidal toxicant concentrates are so-called concentrates containing, for instance, 2 pounds "Heptachlor" per gallon; 1.5 pounds "Dieldrin" per gallon; 1 pound gamma equivalent benzene hexachloride per gallon; and 45% "Nemagon" concentrates. The content of the total of the (a) and (b) ingredients, by weight of the biocidal toxicant concentrate, will fall within the range of 3 to 30%, but, ordinarily, from 6 to 20%, and, particularly, from 8 to 12%, will be found quite satisfactory for most purposes. The relative proportions of the (a) and (b) ingredients, or, in other words, the weight ratio of the (b) to the (a) ingredient, should be at least 3 to 1, and is usually in the range of about 5 to about 20, preferably on an average of about 10, parts of the (b) ingredient to 1 part of the (a) ingredient. Within the limits stated, the proportions of ingredients may be varied in order to obtain optimum results in connection with any particular liquid fertilizer solution.

The percentages or proportions of the (a) and (b) ingredients, as set forth above, are predicated on their being pure substances. In actual commercial practice, the (a) and (b) ingredients as prepared will not be in pure form and, indeed, it is unnecessary that they be used in pure form. Thus, for instance, in the case of the (b) ingredient used in Example A, it may be prepared in the form of an approximately 50% or 60% to 65% or 75% active product. In using such unpurified reaction mixtures comprising the (a) and (b) ingredients, account should be taken of the active ingredient content thereof in selecting the percentages thereof to be used.

The liquid fertilizer solutions (with which the hereinabove described biocidal toxicant concentrates are admixed to form homogeneous emulsions or dispersions which are usable over periods of at least several hours) are, per se, well known in the art. They comprise aqueous solutions, usually strong or concentrated aqueous solutions even up to saturation, of water-soluble compounds which fall into the category of providing at least one of the elements potassium, nitrogen and phosphorus, including, among others, as previously pointed out, potassium chloride, potassium nitrate, potassium sulphate, ammonium nitrate, ammonium sulphate, ammonium phosphate, aqueous ammonia, and the like, as well as organic water-soluble fertilizer materials particularly in conjunction with the inorganic water-soluble salts, such as those mentioned above, an especially preferred example of such organic water-soluble fertilizer material being urea. The liquid fertilizers, which will normally include one or more of the aforementioned materials, may be standardized as to their nitrogen, phosphorus (as $P_2O_5$) and potassium (as $K_2O$) contents. Typical examples of liquid fertilizer solutions, which can be used in conjunction with the novel biocidal toxicant concentrates of my invention are shown in a bulletin entitled, "Preparation of Liquid Fertilizers," Second Edition, published by Victor Chemical Works, Chicago, Illinois.

The following examples are illustrative of biocidal toxicant concentrates, and dispersant compositions for use therein, falling within the scope of my invention. Other specific embodiments will readily occur to those skilled in the art in the light of the guiding teachings and principles disclosed herein. All parts listed are by weight.

*Example A*

| | Parts |
|---|---|
| Dieldrin (99%) | 18 |
| Xylene | 72 |
| Half ammonium half isopropylamine salt of the sulfosuccinic acid ester of the oleic acid amide of monoisopropanolamine (65% active) | 9.7 |
| 2-ethyl-hexanol | 0.3 |

*Example B*

| | |
|---|---|
| Dieldrin | 18 |
| Xylene | 72 |
| Isopropylamine di-salt of nonyl phenol tri-ethenoxy sulfosuccinate (65% active) | 9.7 |
| 2-ethyl-hexanol | 3 |

*Example C*

| | |
|---|---|
| "Heptachlor" | 32.5 |
| "Sovacide 544C" | 57.5 |
| Half ammonium half isopropylamine salt of oleic acid amide of monoisopropanolamine | 9.5 |
| 9 mol ethylene oxide adduct of nonyl phenol | 0.5 |

*Example D*

| | |
|---|---|
| Dieldrin (99%) | 18 |
| Xylene | 72 |
| Isopropylamine di-salt of sulfosuccinic acid di-ester of 2-mol ethylene oxide adduct of soya amines | 7.3 |
| 9 mol ethylene oxide adduct of nonyl phenol | 2 |
| Isopropylamine salt of dodecyl benzene sulfonic acid | 0.7 |

*Example E*

| | |
|---|---|
| Benzene hexachloride (gamma isomer—40%) | 30 |
| Xylene | 60 |
| Isopropylamine di-salt of sulfosuccinic acid di-amide of soya amine-propyl amine (60% active) | 9.1 |
| 9 mol ethylene oxide adduct of nonyl phenol | 0.9 |

*Example F*

| | |
|---|---|
| Dieldrin (99%) | 18 |
| Xylene | 72 |
| Half ammonium half isopropylamine salt of the sulfosuccinic acid ester of 9 mol ethylene oxide adduct of nonyl phenol | 9.3 |
| 7 mol ethylene oxide adduct of hexadecyl amine | 0.7 |

Example G

| | Parts |
|---|---|
| "Heptachlor" | 32.5 |
| "Sovacide 544C" | 57.5 |
| Isopropylamine di-salt of sulfosuccinic acid ester of 10 to 11 mol ethylene oxide adduct of sorbitan mono-oleate | 9.3 |
| Iso-octyl alcohol | 0.7 |

Example H

| | |
|---|---|
| Isopropylamine di-salt of sulfosuccinic acid di-ester of 2 mol ethylene oxide adduct of soya amines | 7.3 |
| 9 mol ethylene oxide adduct of nonyl phenol | 2 |
| Isopropylamine salt of dodecyl benzene sulfonic acid | 0.7 |

Example I

| | |
|---|---|
| Half ammonium half isopropylamine salt of the sulfosuccinic acid ester of 4 mol ethylene oxide adduct of nonyl phenol | 9.3 |
| 2-ethyl-hexanol | 0.7 |

Example J

| | |
|---|---|
| Half ammonium half isopropylamine salt of the sulfosuccinic acid ester of the oleic acid amide of mono-isopropanolamine | 9.5 |
| 2-ethyl-hexanol | 0.5 |

Example K

| | |
|---|---|
| Isopropylamine di-salt of nonyl phenol tri-ethenoxy sulfosuccinate | 9 |
| 9 mol ethylene oxide adduct of nonyl phenol | 1 |

Example L

| | |
|---|---|
| Isopropylamine di-salt of sulfosuccinic acid ester of oleic acid amide of monoethanolamine | 9 |
| 2-ethyl-hexanol | 1 |
| Kerosene | 55 |
| "Cyclosol 53" (organic solvent) | 35 |

The weight ratio between the oleaginous phase, represented by the toxicant concentrate, and the aqueous phase, represented by the strong or concentrated aqueous solution of fertilizer ingredients, can range from 1 to 1 or up to 1 to 10. However, in the usual case of the use of the biocidal toxicant concentrates of my present invention, the amount of the liquid fertilizer solution will be many times the amount of the biocidal toxicant concentrate. In other words, most commonly the aqueous phase of the emulsion will be present in large excess over the oleaginous phase present in the biocidal toxicant concentrate. While such excess may vary somewhat, in the usual case it will be in the range of about 25 or 30 to 60 or even more times that of the oleaginous phase, but will usually be from about 30 to 40 times that of the oleaginous phase, all in terms of parts by weight.

In the use of the biocidal toxicant concentrates of my invention, the same are simply admixed with the aqueous or liquid fertilizer solution, with suitable agitation. For instance, 2.5 parts of the toxicant concentrate of Example A are admixed, with stirring, with 97.5 parts of each of three standard liquid fertilizer solutions, namely, (1) 8–24–0 Diammonium phosphate solution, a 43.2 solution of diammonium phosphate, (2) Uran 32, a solution of 44.3 parts ammonium nitrate and 35.4 parts urea in 20.3 parts water, and (3) 4–10–10, a solution of 18.1 parts ammonium phosphate, 1.5 parts urea, and 16.4 parts potassium chloride in 64 parts water. In another typical example, 3 parts of the toxicant concentrate of Example B are admixed with 97 parts of Uran 32. Again, 3.3 parts of the toxicant concentrate of Example D are admixed with 96.7 parts of Uran 32. Still further, 3 parts of the toxicant concentrate of Example D are admixed with 97 parts of a 4–10–10 liquid fertilizer (urea-diammonium phosphate-potassium chloride solution); and 3.2 parts of the toxicant concentrate of Example E are admixed with 96.8 parts of a 9–9–9 liquid fertilizer (urea-diammonium phosphate-potassium chloride solution). Other illustrative commercial types of liquid fertilizer solutions with which my novel biocidal toxicant concentrates can be used are the so-called 8–8–8 (derived from ammonium phosphate, potassium chloride and urea), and 10–20–0 (derived from ammonium phosphate and urea).

Supplemental ingredients can be added so long as they, or the proportions thereof employed, do not adversely affect the useful properties and characteristics of the compositions of my present invention. Thus, by way of illustration, and as is shown in Examples D and H, amine salts of alkyl benzene sulfonic acids in which the alkyl radical contains from 12 to 18 can be added, preferably in minor proportions.

The dispersant compositions of the present invention have unusual utility in connection with the production of toxicant concentrates for use in conjunction with aqueous solutions containing high concentrations of fertilizer ingredients, all as has been described above in detail. They have a broader utility, however, namely, in connection with the production of stable emulsions of oleaginous and aqueous materials in the presence of high concentrations of ionizable materials, notably inorganic salts. It is well known that the presence of ionizable materials such as sodium chloride, sodium sulfate, magnesium chloride, magnesium sulfate and other monovalent and polyvalent inorganic salts, in oleaginous-aqueous emulsion systems, very seriously affects the stabilities of such emulsions, especially where the concentrations of said salts in the aqueous phase are of the order of even a few percent. The dispersant compositions of this invention makes possible the production of stable emulsions even under the highly adverse environmental conditions of high concentrations of strongly ionizable salts.

Where reference is made to water-insoluble biocidal toxicants, it will be understood that such is intended to encompass biocidal toxicants which are insoluble in water as well as biocidal toxicants which are insoluble in the liquid fertilizers per se irrespective of their solubility in water per se.

I claim:

1. A dispersant composition, having the property of being soluble and forming essentially clear solutions in biocidal toxicant concentrates in the form of organic solvent solutions of water-insoluble biocidal toxicants, comprising (a) a non-ionic surface active agent in the form of a polyoxyalkylene oxide adduct of an organic compound having a terminal group containing a reactive hydrogen atom and selected from the class consisting of alkyl monohydric and aliphatic polyhydric alcohols; polypropylene oxides; mono-ethers of polypropylene glycol and polybutylene glycol with hydroxy-alkyl, hydroxy-aryl and hydroxy-alkyl-aryl compounds; fatty acids; fatty acid amides; alkyl mercaptans; partial fatty acid esters of aliphatic polyhydric alcohols; alkylated phenols; and hydroxy-alkyl-aryl compounds, the aforesaid organic compounds having at least one lipophilic group containing from 6 to 26 carbon atoms and having not more than 2 aromatic rings, and the polyoxyalkylene portion of said non-ionic surface active agent being selected from the group consisting of polyoxyethylene and polyoxypropylene, the number of alkylene oxide groups being from 4 to 60 when the alkylene oxide is ethylene oxide, and being up to 10 when the alkylene oxide is propylene oxide, and (b) a member selected from the group consisting of the organic substituted ammonium salts and the mixed alkali metal-organic substituted ammonium salts of sulfopolycarboxylic acid esters and sulfopolycarboxylic acid amides of lipophilic compounds containing an aliphatic hydrocarbon radical having from 8 to 26 carbon atoms, the weight ratio of said (b) to said (a) ingredient being at least 3 to 1.

2. A dispersant composition, having the property of being soluble and forming essentially clear solutions in biocidal toxicant concentrates in the form of organic solvent solutions of water-insoluble biocidal toxicants, comprising (a) a non-ionic emulsifier in the form of an organic solvent-soluble compound having a polyoxyethylene radical containing up to 60 oxyethylene groups linked to a higher molecular weight radical containing from 8 to 26 carbon atoms, and (b) a member selected from the group consisting of the organic substituted ammonium salts and the mixed alkali metal-organic substituted ammonium salts of sulfopolycarboxylic acid esters and sulfopolycarboxylic acid amides of lipophilic compounds containing an aliphatic hydrocarbon radical having from 8 to 26 carbon atoms, the weight ratio of said (b) to said (a) ingredient being at least 3 to 1.

3. A dispersant composition having the property of being soluble and forming essentially clear solutions in biocidal toxicant concentrates in the form of organic solvent solutions of water-insoluble biocidal toxicants, comprising (a) a non-ionic surface active agent in the form of a normally liquid compound having a higher molecular weight radical containing from 8 to 26 carbon atoms linked to a polyoxyethylene radical containing from 5 to 20 oxyethylene groups, and (b) a member selected from the group consisting of the organic substituted ammonium salts and the mixed alkali metal-organic substituted ammonium salts of sulfopolycarboxylic acid esters and sulfopolycarboxylic acid amides of lipophilic compounds containing an aliphatic hydrocarbon radical having from 8 to 26 carbon atoms, the weight ratio of said (b) to said (a) ingredient being at least 3 to 1.

4. A dispersant composition in accordance with claim 1, wherein the (a) ingredient is a polyoxyethylene adduct of an alkyl phenol having at least one alkyl group with from 5 to 18 carbon atoms, said adduct containing from 8 to 20 oxyethylene groups.

5. A dispersant composition in accordance with claim 1, wherein said (b) ingredient is a half alkali metal-half isopropyl amine salt of the sulfosuccinic acid ester of the oleic acid amide of monoisopropanolamine.

6. A dispersant composition in accordance with claim 1, wherein said (b) ingredient is a half alkali metal-half isopropyl amine salt of the sulfosuccinic acid ester of the oleic acid amide of monoisopropanolamine.

7. A toxicant concentrate comprising an organic solvent solution of an organic water-insoluble biocidal toxicant and containing, dissolved therein, (a) a non-ionic surface active agent in the form of a polyoxyalkylene oxide adduct of an organic compound having a terminal group containing a reactive hydrogen atom and selected from the class consisting of alkyl monohydric and aliphatic polyhydric alcohols; polypropylene oxides; monoethers of polypropylene glycol and polybutylene glycol with hydroxy-alkyl, hydroxy-aryl and hydroxy-alkyl-aryl compounds; fatty acids; fatty acid amides; alkyl mercaptans; partial fatty acid esters of aliphatic polyhydric alcohols; alkylated phenols; and hydroxy-alkyl-aryl compounds, the aforesaid organic compounds having at least one lipophillic group containing at least 6 carbon atoms and having not more than 2 aromatic rings, and the polyoxyalkylene portion of said non-ionic surface active agent being selected from the group consisting of polyoxyethylene and polyoxypropylene, the number of alkylene oxide groups being from 4 to 60 when the alkylene oxide is ethylene oxide, and being up to 10 when the alkylene oxide is propylene oxide, and (b) a member selected from the group consisting of the organic substituted ammonium salts and the mixed alkali metal-organic substituted ammonium salts of sulfopolycarboxylic acid esters and sulfopolycarboxylic acid amides of lipophillic compounds containing an aliphatic hydrocarbon radical having from 8 to 26 carbon atoms, the weight ratio of said (b) to said (a) ingredient being at least 3 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

8. A toxicant concentrate comprising an organic solvent solution of an organic water-insoluble biocidal toxicant and containing, dissolved therein, (a) a non-ionic surface active agent in the form of a compound having a higher molecular weight radical containing from 8 to 26 carbon atoms linked to a polyoxyethylene radical containing from 5 to 20 oxyethylene groups, and (b) a member selected from the group consisting of the organic substituted ammonium salts and the mixed alkali metal-organic substituted ammonium salts of sulfopolycarboxylic acid esters and sulfopolycarboxylic acid amides of lipophillic compounds containing an aliphatic hydrocarbon radical having from 8 to 26 carbon atoms, the weight ratio of said (b) to said (a) ingredient being from 5 to 20 of (b) to 1 of (a), the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

9. A toxicant concentrate comprising an organic solvent solution of an organic water-insoluble biocidal toxicant and containing, dissolved therein, (a) a polyoxyethylene adduct of an alkyl phenol having at least one alkyl group with from 5 to 18 carbon atoms, said adduct containing from 8 to 20 oxyethylene groups, and (b) a member selected from the group consisting of the organic substituted ammonium salts and the mixed alkali metal-organic substituted ammonium salts of sulfopolycarboxylic acid esters and sulfopolycarboxylic acid amides of lipophillic compounds, containing an aliphatic hydrocarbon radical having from 6 to 26 carbon atoms, the weight ratio of said (b) to said (a) ingredient being from 5 to 20 of (b) to 1 of (a), the total of said (a) and (b) ingredients constituting from 6 to 20%, by weight, of said concentrate, said concentrate being adapted, upon admixture with aqueous solutions containing upwards of 20% of fertilizer ingredients, to form a homogeneous dispersion usable for periods of the order of at least several hours.

10. A combination biocidal toxicant water-soluble inorganic salt fertilizer composition containing an aqueous phase comprising a water solution of at least 20% of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a non-ionic surface active agent in the form of a polyoxyalkylene oxide adduct of an organic compound having a terminal group containing a reactive hydrogen atom and selected from the class consisting of alkyl monohydric and aliphatic polyhydric alcohols; polypropylene oxides; mono-ethers of polypropylene glycol and polybutylene glycol with hydroxy-alkyl, hydroxy-aryl and hydroxy-alkyl-aryl compounds; fatty acids; fatty acid amides; alkyl mercaptans; partial fatty acid esters of aliphatic polyhydric alcohols; alkylated phenols; and hydroxy-alkyl-aryl compounds, the aforesaid organic compounds having at least one lipophillic group containing from 6 to 26 carbon atoms, and having not more than 2 aromatic rings, and the polyoxyalkylene portion of said non-ionic surface active agent being selected from the group consisting of polyoxyethylene and polyoxypropylene, the number of alkylene oxide groups being from 4 to 60 when the alkylene oxide is ethylene oxide, and being up to 10 when the alkylene oxide is propylene oxide, and (b) a member selected from the group consisting of the organic substituted ammonium salts and the mixed alkali metal-organic substituted ammonium salts of sulfopolycarboxylic acid esters and sulfopolycarboxylic acid amides of lipophillic compounds containing an aliphatic hydrocarbon radical having from 8 to 26 carbon atoms, the weight ratio of said (b) to said (a) ingredient being at least 3 to 1, the total of said (a) and (b) ingredients constituting from 6 to 20%, by weight, of the water-immiscible oleaginous phase.

11. A combination biocidal toxicant water-soluble inorganic salt fertilizer composition containing an aqueous phase comprising a water solution of at least 20% of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a polyoxyethylene adduct of an alkyl phenol having at least one alkyl group with from 5 to 18 carbon atoms, said adduct containing from 8 to 20 oxyethylene groups, and (b) a member selected from the group consisting of the organic substituted ammonium salts and the mixed alkali metal-organic substituted ammonium salts of sulfopolycarboxylic acid esters and sulfopolycarboxylic acid amides of lipophillic compounds containing an aliphatic hydrocarbon radical having from 8 to 26 carbon atoms, the weight ratio of said (b) to said (a) ingredient being from 5 to 20 of (b) to 1 of (a), the total of said (a) and (b) ingredients constituting from 6 to 15%, by weight, of the water-immiscible oleaginous phase.

References Cited by the Examiner

UNITED STATES PATENTS

| | | | |
|---|---|---|---|
| Re. 24,184 | 7/1956 | Sanders | 167—42 |
| 2,251,940 | 8/1941 | Katzman | 260—401 |
| 2,558,762 | 7/1951 | Kohr | 71—2.6 X |
| 2,679,526 | 5/1954 | De Groote | 260—481 |
| 2,770,538 | 11/1956 | Vierling | 71—1 X |
| 2,898,267 | 8/1959 | Lindner | 167—42 |
| 2,976,208 | 3/1961 | Lindner | 167—42 |
| 2,976,209 | 3/1961 | Lindner | 167—42 |
| 2,976,211 | 3/1961 | Lindner | 167—42 |
| 3,074,791 | 1/1963 | Scoles | 71—2.3 X |
| 3,080,280 | 3/1963 | Lindner | 167—42 |

LEWIS GOTTS, *Primary Examiner.*

M. A. BRINDISI, *Examiner.*